United States Patent [19]
Hernandez

[11] Patent Number: 5,860,047
[45] Date of Patent: Jan. 12, 1999

[54] SYSTEM AND METHOD FOR VARIABLE TONER OUTPUT IN OUTPUT DEVICES

[75] Inventor: Mathew W. Hernandez, El Granada, Calif.

[73] Assignee: Apple Computer, Inc., Cupertino, Calif.

[21] Appl. No.: 845,342
[22] Filed: Apr. 25, 1997
[51] Int. Cl.$^6$ ............... G03G 15/04; G06F 15/00; B41J 2/385
[52] U.S. Cl. ............... 399/181; 347/131; 347/254; 358/298; 395/109
[58] Field of Search ............... 399/181, 51; 347/131, 347/254; 395/108, 115, 109; 358/298

[56] References Cited

U.S. PATENT DOCUMENTS

| | | | |
|---|---|---|---|
| 4,963,989 | 10/1990 | Morton | 342/131 X |
| 5,023,632 | 6/1991 | Yamamoto et al. | 347/131 X |
| 5,245,355 | 9/1993 | Morton | 347/131 X |
| 5,321,430 | 6/1994 | Barnstead et al. | 347/254 X |
| 5,381,221 | 1/1995 | Mizoguchi et al. | 399/51 X |

Primary Examiner—S. Lee
Attorney, Agent, or Firm—Nancy R. Simon

[57] ABSTRACT

A pixel matrix preferably containing nine pixels is analyzed to determine whether or not all of the image values for the pixels in the pixel matrix correspond to a full saturation level. If the image values do correspond to full saturation level, preferably the center pixel is produced using a variably reduced toner output. If all of the image values do not correspond to full saturation level, the center pixel is produced using conventional methods. The system of the preferred embodiment is comprised of an input buffer for storing the image values, a comparator for comparing the image values with a toner modification value to determine if the pixel or pixels should be produced using a variably reduced toner output. The pixels are then preferably stored temporarily in an output buffer and then sent to a memory to be produced.

23 Claims, 7 Drawing Sheets

Test

Test

SYSTEM AND METHOD FOR VARIABLE TONER OUTPUT IN OUTPUT DEVICES

BACKGROUND OF THE INVENTION

1. Field of the Invention

The present invention relates to output devices, and more particularly to output devices that use toner to produce an image. Still more particularly, the present invention relates to a method and system for variable toner output in output devices.

2. Description of the Prior Art

Several types of output devices use toner as the means for producing images, such as text and graphics, on a page. Examples of such output devices include laser printers, copiers, and facsimile machines. Typically, the cost of toner is a significant expense when operating these types of output devices. For example, paper can cost approximately one cent per page while toner can cost one to ten cents a page depending on the amount of toner used.

Contemporary output devices, such as printers, have an economy output mode in addition to a normal output mode. When selected, the economy output mode reduces the amount of toner used on a page during printing. Economy output mode is useful when a lower quality print is desired, such as when printing a draft of a document or checking the layout of a page.

One drawback to contemporary economy output mode implementations is that many are implemented using a low resolution screen to mask a fixed percentage of all picture elements, or pixels. In other words, pixels are printed by dropping out a certain percentage of pixels in some fixed pattern regardless of the image content. The problem with this is that at times a user can detect transitions, or defects, in the image after it is produced. This is especially true if the transition occurs on a edge of a character or graphic. This is because the human perception system is more sensitive to edges than to smooth transitions.

Figure 1A:
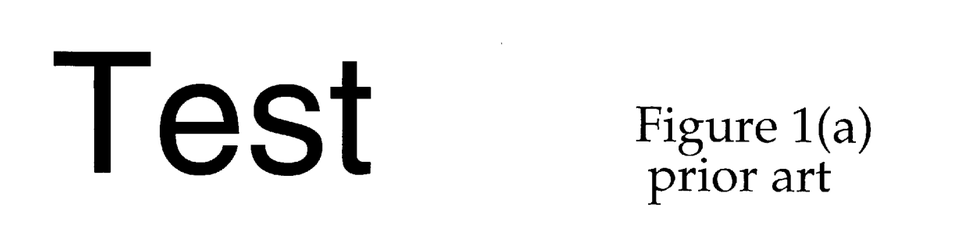
FIGS. 1(a)–1(c) depict a prior art system for variable toner output in an output device.
Figure 1B:
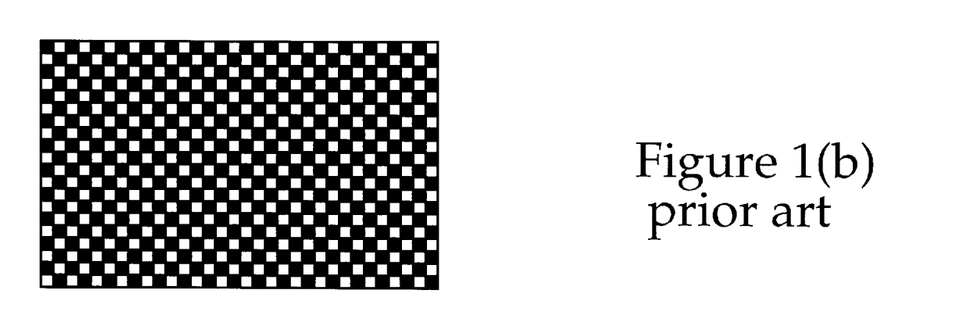
Figure 1C:
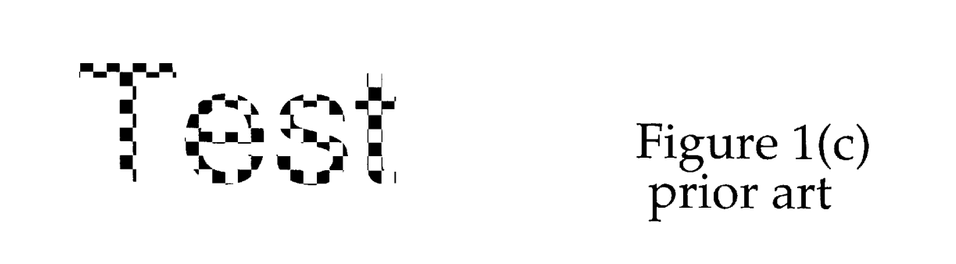

FIGS. 1(a)–1(c) depict a prior art system for variable toner output in an output device. FIG. 1(a) illustrates the original image, which in this example is the word "Test". A fifty percent fixed mask is used as the economy mode in the output device, as shown in FIG. 1(b). When the word "Test" is produced using the economy mode, pixels are printed by dropping out a certain percentage of pixels (i.e., 50%). The resulting image is illustrated in FIG. 1(c). As can be seen, transitions between filled pixels and non-filled pixels occur inside each letter as well as on their edges. Because the human perception system is more sensitive to transitions on the edge of an image, a user may detect defects (i.e., the transitions) in the image when produced using this prior art system.

Another drawback to contemporary economy output mode implementations is that the toner is typically reduced by a fixed amount, such as fifty percent. A user can not select the amount of toner reduction. For example, a user may desire a larger toner reduction, such as seventy-five percent when producing draft documents. Alternatively, a user may want to reduce toner output by only twenty percent. With current economy output modes, a user can not select the amount of toner reduction, but must instead employ the amount of toner reduction that has been predetermined by a manufacturer.

SUMMARY OF THE INVENTION

The present invention overcomes the limitations of prior art systems by providing a method and system for variable toner output in output devices. A pixel matrix preferably containing nine pixels is analyzed to determine whether or not all of the image values for the pixels in the pixel matrix correspond to a full saturation level. If the image values do correspond to full saturation level, preferably the center pixel is produced using a variably reduced toner output. If all of the image values do not correspond to full saturation level, the center pixel is produced using conventional methods.

The system of the preferred embodiment is comprised of an input buffer for storing the image values, a comparator for comparing the image values with a toner modification value to determine if the pixel or pixels should be produced using a variably reduced toner output. The pixels are then preferably stored temporarily in an output buffer and then sent to a memory to be produced.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

To facilitate an understanding of the present invention, it is described hereinafter in the context of a specific embodiment. In particular, reference is made to the implementation of the invention in a monochrome laser printer. It will be appreciated, however, that the practical applications of the invention are not limited to this particular embodiment. Rather, the invention can be employed in other types of output devices that use toner to produce an image, examples being color laser printers, copiers and facsimile machines.

Figure 2:
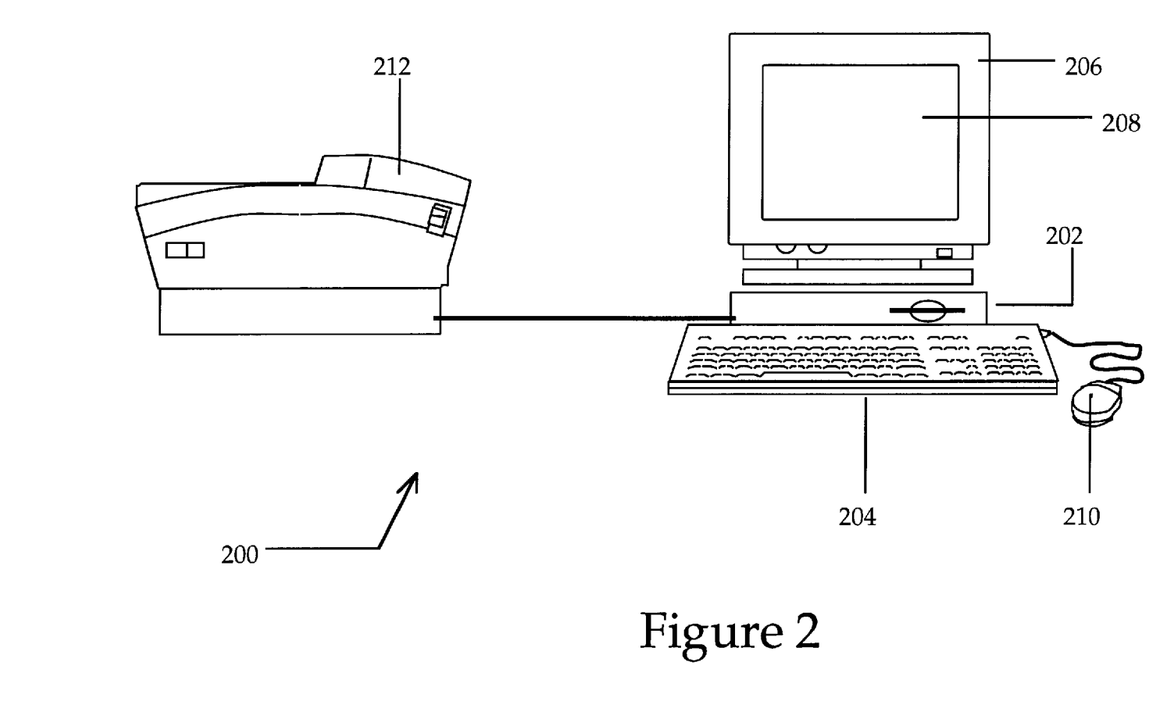
FIG. 2 is a pictorial illustration of an exemplary system that can be used to implement a method for variable toner output in output devices according to the present invention.

With reference now to the figures and in particular with reference to FIG. 2, an exemplary system that can be used to implement the method for variable toner output in output devices according to the present invention is illustrated. System 200 includes a computer 202, keyboard 204, a monitor 206 having a display screen 208, a cursor control device 210, shown here as a mouse, and a printer 212. Computer system 200 may be implemented using any suitable computer, such as a Power Macintosh™ 7300 computer, a product of Apple Computer, Incorporated, located in Cupertino, Calif. Printer 212 is a monochrome laser printer, such as a LaserWriter 12/640™ printer, also a product of Apple Computer, Incorporated.

Figure 3:
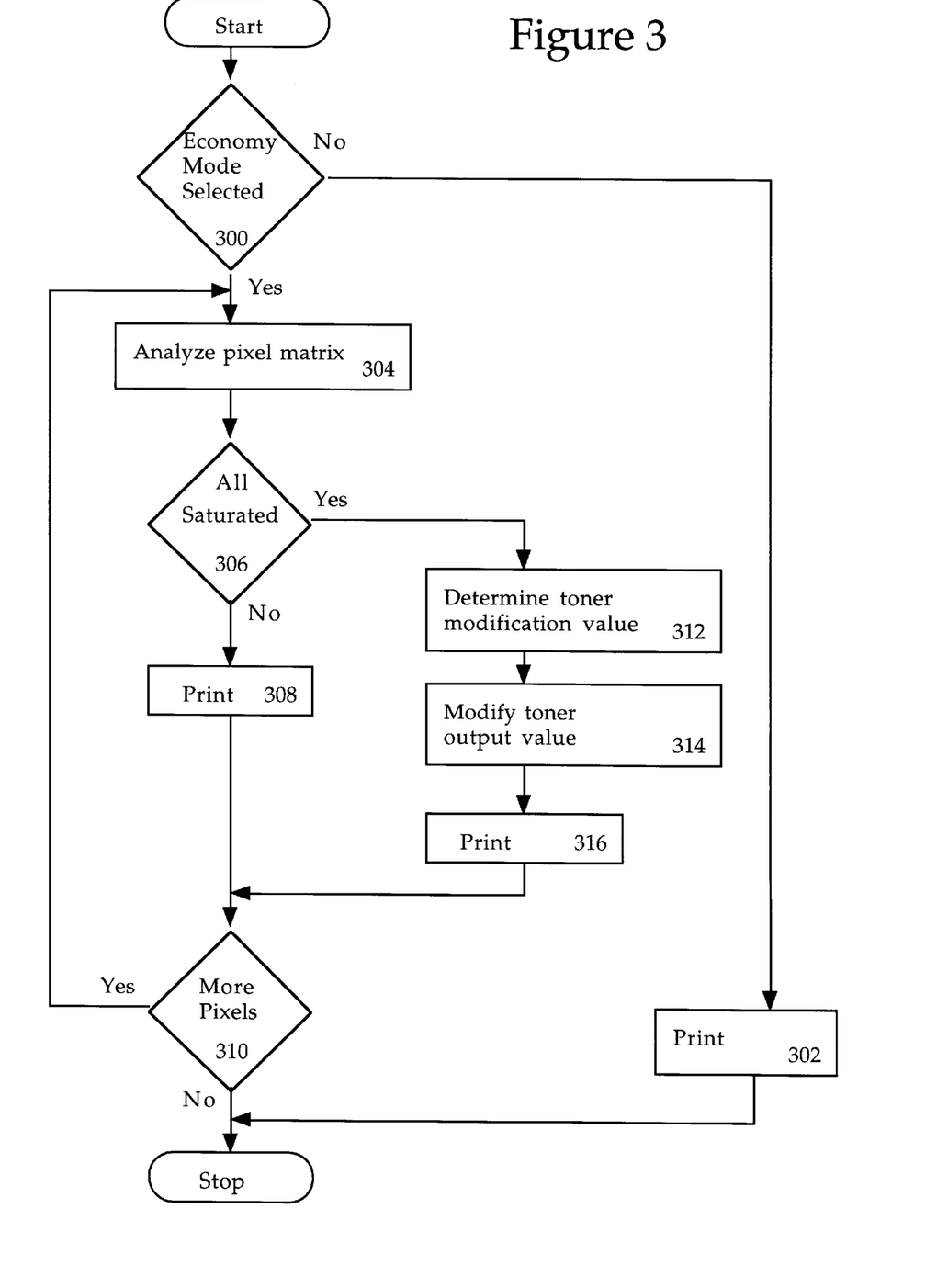
FIG. 3 is a flowchart depicting a preferred method for variable toner output in output devices according to the present invention.

FIG. 3 is a flowchart depicting a preferred method for variable toner output in output devices according to the present invention. The process begins with an image to be produced. In this context, "image" refers to any image to be produced, such as characters, graphics and photographic images. In the preferred embodiment, the image to be produced will be printed on a monochrome laser printer.

The process begins at step 300 with a determination as to whether or not a variable toner output mode (hereinafter "economy mode") has been selected. If the economy mode has not been selected, the image is printed using conventional methods, as shown in block 302. If the economy mode has been selected, the process continues in the preferred embodiment with an analysis of the image values for a portion of pixels to be printed. This step is illustrated in block 304. In the preferred embodiment, the portion of pixels that are analyzed correspond to a three-by-three (3×3) matrix of pixels, and the pixel that is to be printed from the matrix is the center pixel only. The preferred method for analyzing a portion of the pixels to be printed is described below with reference to FIG. 4.

After the image values in the pixel matrix are analyzed, a determination is made at block 306 as to whether or not all of the image values for the pixels in the pixel matrix correspond to a full saturation level. In this context, "saturation" refers to a pixel that will be represented by a fully saturated color, one example being black. If all of the image values are not saturated, preferably the center pixel is printed using conventional methods. This step is shown in block 308.

A determination is then made in step 310 as to whether or not there are more pixels to be printed. If so, the process returns to block 304 and repeats until all of the pixels have been analyzed. If there are no more pixels to be analyzed, the process ends.

Figure 7:
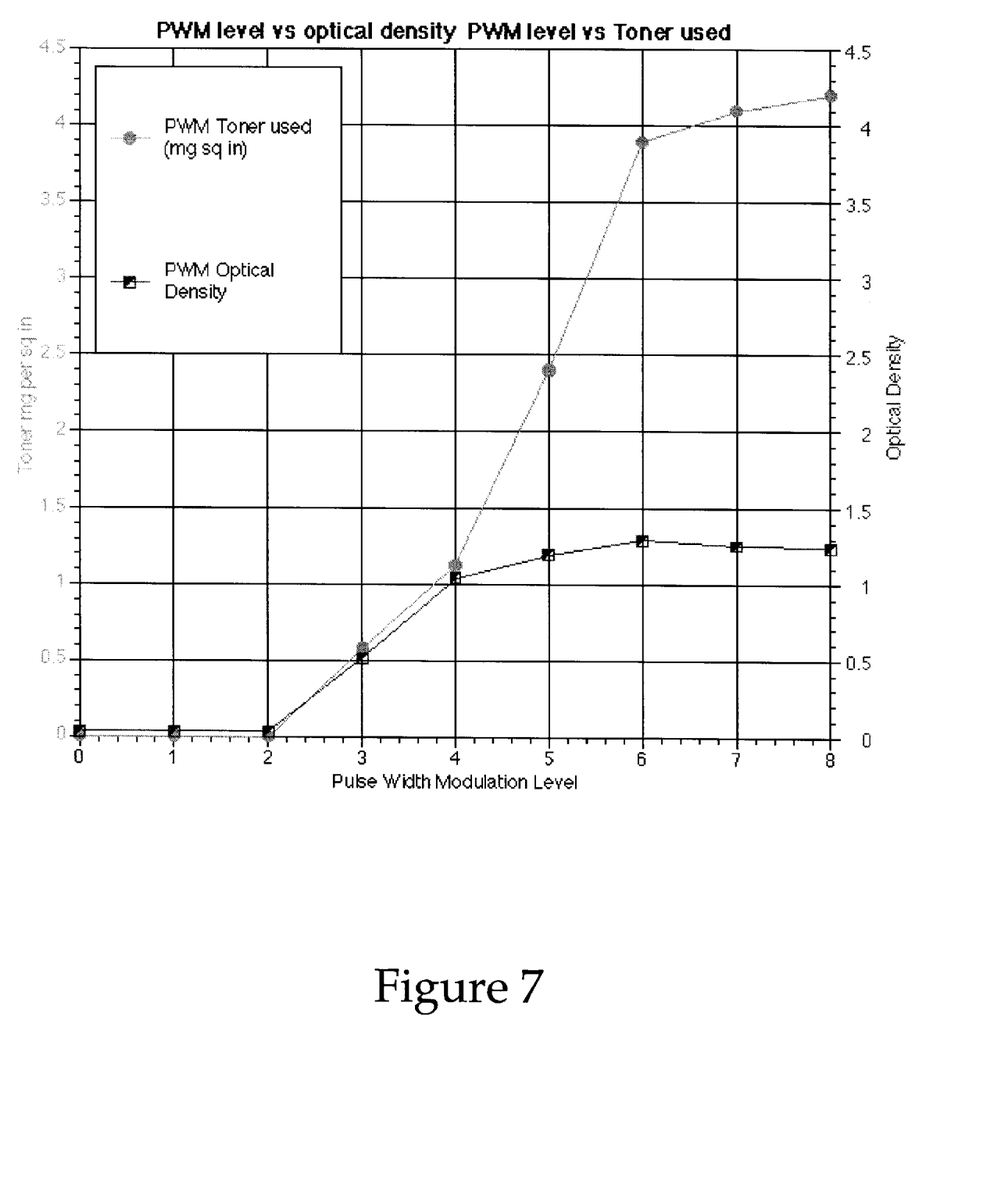
FIG. 7 is a graph depicting a pulse width modulation level plotted against a variable toner output and an optical density of the variable toner output according to an exemplary embodiment of the present invention.

Referring again to step 306, if all of the image values correspond to full saturation, the process continues at block 312 where a toner modification value is determined. In the preferred embodiment, when selecting the economy mode, a user also selects a toner modification value to be used when printing. In the preferred embodiment, a user can select from nine toner modification values (0–8). Level zero represents no toner, and level eight represents complete toner (full saturation). Levels 1–7 represent graduated levels of toner output levels increasing the toner output as the user selects higher numbered values. FIG. 7 illustrates the effects on optical density and toner output for each toner modification value.

Based upon the user's selection, a modified toner output value is determined, as shown in block 314. In the preferred embodiment, the modified toner output value corresponds to a pulse width modulation value. With the pulse width modulation value, the pulse duration of the laser in the monochrome laser printer is modulated. In other words, the amount of time the laser is activated is modified.

Those skilled in the art, however, will appreciate that the modified toner output value is not limited to corresponding to a pulse width modulation value. The modified toner output value can correspond to any function that when modified, affects the amount of toner output by an output device. For example, the toner modulation value can correspond to a pulse intensity modulation value, where the intensity of the laser is modified.

As discussed earlier, based upon the toner modification value obtained at block 312, the level of toner to be used when printing is adjusted, as shown in step 314. The center pixel is then printed using a reduced toner level, as illustrated in block 316. Finally, a determination is made in step 310 as to whether or not there are more pixels to be analyzed. If so, the process returns to step 304 and repeats until all of the pixels have been analyzed and then printed.

Figure 4:
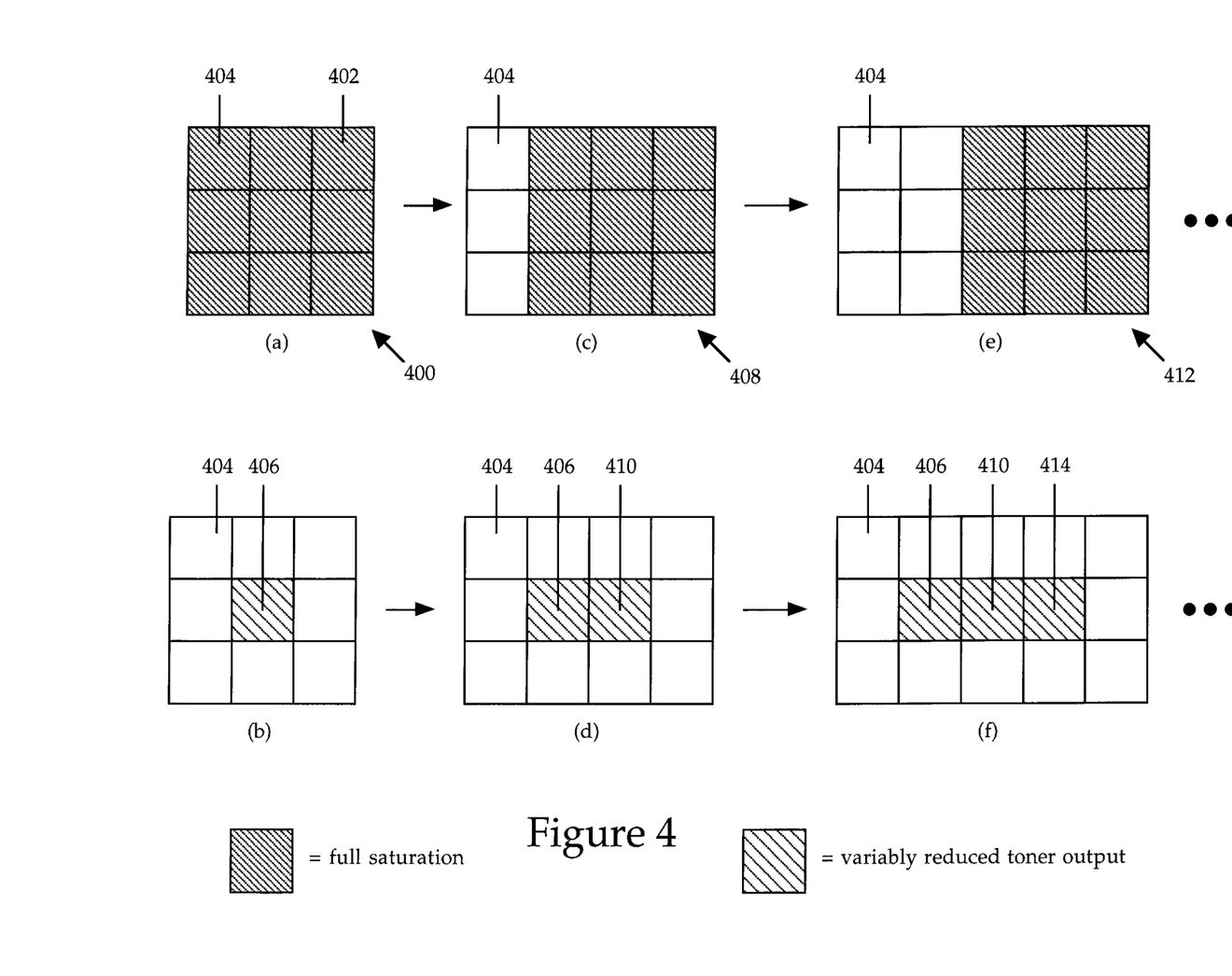
FIGS. 4(a)–(f) are pictorial representations of a preferred method for analyzing the image values for a portion of pixels in an image to be produced and the resulting output based upon the preferred method for analyzing a portion of image values.

Referring to FIGS. 4(*a*)–(*f*), pictorial representations represent a preferred method for analyzing the image values for a portion of pixels in an image to be produced (step 304 in FIG. 3), and the resulting output based upon the preferred method for analyzing a portion of image values. As discussed earlier, the portion analyzed in the preferred embodiment is a 3×3 pixel matrix. For purposes of this example, each pixel 402 in pixel matrix 400 has an image value that corresponds to a full saturation output level. As discussed earlier, the full saturation output level in the preferred embodiment corresponds to the color black. Also in the preferred embodiment, each row of pixels in pixel matrix 400 corresponds to a raster scan line.

In FIG. 4(*a*), pixel 404 preferably indicates the first pixel in the first raster line of an image to be printed. In the preferred embodiment, the image values for each pixel in pixel matrix 400 are analyzed to determine if each image value is set to a value that corresponds to full saturation. If the image values for each pixel in pixel matrix 400 are set to full saturation, the pixel in the center of pixel matrix 400 is produced using a modified toner output value for pixel 406 (see FIG. 4(*b*)). Thus, in the example of FIG. 4, when pixel 406 is produced, it is produced using a variably reduced toner output. If however, the image values for each pixel in pixel matrix 400 do not correspond to full saturation, pixel 406 in pixel matrix 400 is produced using customary toner levels (not shown).

The preferred method for analyzing a portion of image values continues in FIG. 4(*c*). After moving over one column, pixel matrix 408 is analyzed. Pixel matrix 408 is 3×3 pixel matrix that is highlighted in FIG. 4(*c*). Note that pixel matrix 408 does not include all of the pixels that were in pixel matrix 400 in the preferred embodiment. In particular, pixel 404 and the pixels below it are not in pixel matrix 408.

The image values for each pixel in pixel matrix 408 are analyzed to determine if each image value corresponds to full saturation. If the image values for each pixel in pixel matrix 408 are set to full saturation, preferably the center pixel in pixel matrix 408 is produced using a modified toner output value for pixel 410 (see FIG. 4(*d*)). If however, the image values for each pixel in pixel matrix 408 are not set to full saturation, the pixel 410 is produced using customary toner levels (not shown).

FIG. 4(*e*) illustrates the continuation of the preferred method for analyzing a portion of image values. After moving over one column, pixel matrix 412 is analyzed. As discussed above, the image values for each pixel in pixel matrix 412 are analyzed to determine if each pixel display value corresponds to full saturation. If the image values for each pixel in pixel matrix 412 are set to full saturation, pixel 414 is produced using a modified toner output value for pixel 314 (see FIG. 4(*f*)). If however, the image values for each pixel in pixel matrix 408 are not set to full saturation, pixel 414 is produced using customary toner levels (not shown).

When all of the pixels in the three raster scan lines in the image have been analyzed, and there are more pixels in the image that need to be produced, the method continues by preferably dropping down one raster scan line. New 3×3 pixel matrices are then created and analyzed until all of the pixels in those raster scan lines have been analyzed. This continues until all of the pixels in the image have been analyzed and printed.

Figure 5:
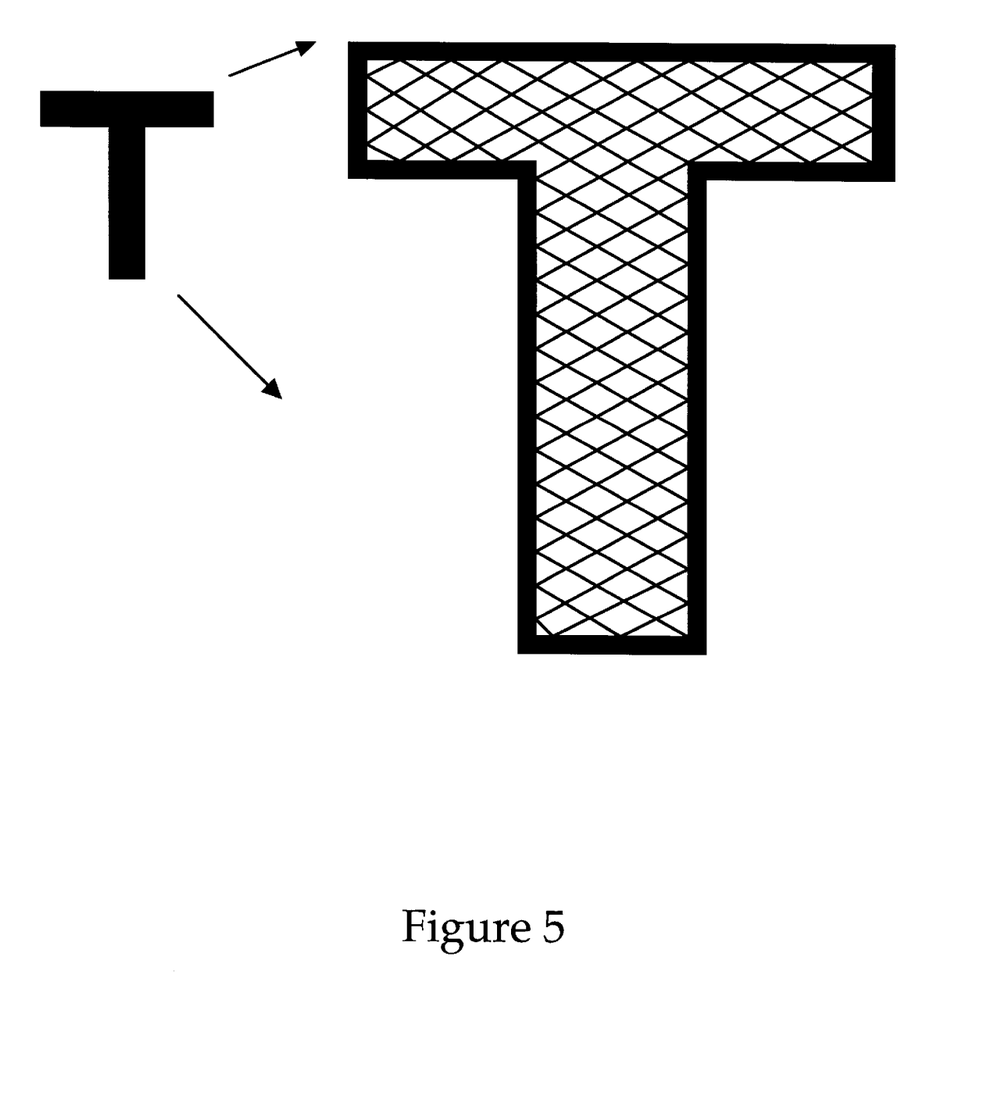
FIG. 5 is a pictorial representation of the letter "T" expanded to illustrate the variable toner output according to the present invention.

FIG. 5 is a pictorial representation of the letter "T" expanded to illustrate the variable toner output according to the present invention. As can be seen, the edges of the letter "T" are produced using a saturated color, in this example the color black. The interior pixels have been produced using a variably reduced toner output. Depending upon the toner modification value selected by the user, the human eye may not be able to discern the difference in toner outputs in this letter "T". That is because the human perception system is more sensitive to edges than to smooth transitions. The method of the present invention preserves the edges of an image, such as the letter "T", while using less toner for the interior pixels. In this manner, the human perception system can be deceived into seeing an output that looks similar to an image produced using convention toner levels.

Figure 6:
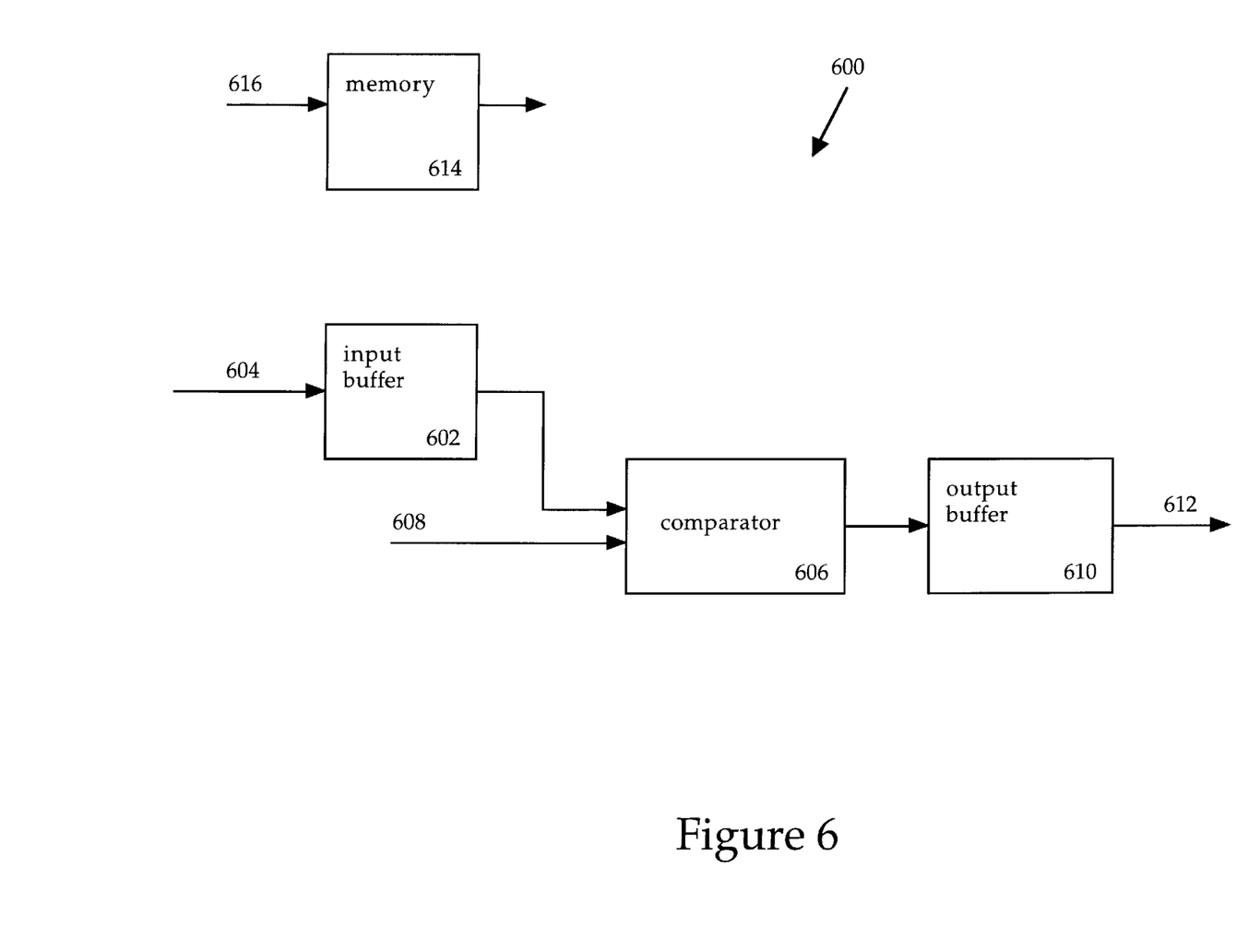
FIG. 6 is a block diagram of an exemplary system that can be used to implement a system for variable toner output in output devices according to the present invention.

Referring to FIG. 6, a block diagram of an exemplary system that can be used to implement a system for variable toner output in output devices according to the present invention is illustrated. In system 600 image values are input into input buffer 602 via line 604. Comparator 606 compares the image values with data values input into comparator 606 via line 608. In the preferred embodiment, the data values input into comparator 606 on line 608 indicate whether or not the economy mode has been selected, and if so, the toner modification value selected by the user.

Comparator 606 then determines if the toner should be reduced when printing a pixel. If the user has selected the economy mode and toner modification value, comparator 606 outputs a modified toner output value for the pixel or pixels to be printed (in the preferred embodiment, that would be the center pixel in the pixel matrix). The modified toner output value is temporarily stored in output buffer 610 and then sent to memory 614.

Memory 614 is used to store the image values to be printed. In the preferred embodiment, three scan lines of pixels are input into memory 614 and one scan line is output to the printer. The image values that are output to the printer from memory 614 are comprised of any modified toner output values in addition to any non-modified image values. In the preferred embodiment, memory 614 is a random access memory (RAM).

FIG. 7 is a graph that depicts a pulse width modulation level plotted against a variable toner output and an optical density of the variable toner output according to an exemplary embodiment of the present invention. The variable toner output is represented on the left vertical axis, the optical density of the variable toner output is represented on the right vertical axis, and the pulse width modulation level is represented on the bottom horizontal axis.

In this exemplary embodiment of the present invention, the pulse width modulation levels correspond to nine toner modification values (0–8). Zero represents no toner output and eight represents full toner output (i.e., full saturation). As can be seen, when the pulse width modulation level is set at four (4), the toner output level is approximately 1.2 mg per square inch and the optical density is just above 1. Compare this to a pulse width modulation level selection of eight (8), where the toner output level is approximately 4.2 mg. per square inch and the optical density level is approximately 1.2. Even though three and a half times as much toner is used at pulse width modulation level 8, the optical density does not increase that significantly. Thus, from a user's perspective, less toner can be used while still achieving an optical density level that nears the optical density of the toner output at full saturation.

Alternatively, a user can select a pulse width modulation level of three (3). In this case, the toner output level is approximately 0.6 mg per square inch and the optical density is approximately 0.5. Thus, the optical density is reduced by approximately forty-two percent (42%) compared to level 8, but at level 3 only 0.6 mg of toner is used per square inch. This is a significant reduction in toner output, namely eighty-eight percent (88%). Thus, even though there is an 88% reduction in the amount of toner used per square inch, the optical density is reduced by only 42%. Reducing the toner output by 88% allows a user to get more documents produced for less money, because the user will not be buying toner as frequently as he or she would when producing documents at level 8.

One of the advantages of the present invention is that a user replaces the toner cartridge less often, thereby saving the user time and money. Another advantage is that it can be used to produce watermarks and like markings on a page. For example, a user may want to indicate a document is confidential. The user can use a watermark for that purpose. The watermark will be visible on each page but will not cover words or pictures on each page, thereby allowing a person to read each page unaffected by the watermark. Yet another advantage to the present invention is that it allows a user to customize documents and pages prior to performing a final print job. A user can see what a page will look like when produced without using a lot of toner. And finally, the present invention can also be used with a variety of images, including images that have been screened (e.g. halftoned).

While the invention has been particularly shown and described with reference to a preferred embodiment, it will be understood by those skilled in the art that various changes in form and detail may be made therein without departing from the spirit and scope of the invention. For example, the present invention may be implemented using a higher or smaller number of toner modification values. For example, a user can select from four toner modification values, or sixteen modification values. Additionally, the pixel matrix can be comprised of more or less pixels. And more pixels can be produced in the pixel matrix, compared to the preferred embodiment where only the center pixel is produced. Alternatively, each pixel can be analyzed one at a time instead of being part of a pixel matrix. And finally, an entire image or page does not have to be produced using the same toner modification value. A user can select a portion of an image or page to be produced using one toner modification value and then select a different portion of the same image or page to be produced using a different toner modification value. Or a user can select one image or page in a document be produced using one toner modification value and then select a different image or page in the same document to be produced using a different toner modification value. These selections can then be combined and produced together at the same time or they can be produced separately at different times. Other changes in form and detail may be made without departing from the spirit and scope of the invention.

What is claimed is:

1. A method for variable toner output in an output device when the output device is producing an image, wherein the image is comprised of at least one pixel having an image value, and wherein the output device has more than one toner modification value to select from, the method comprising the steps of:
   determining whether an image value for a particular pixel in the image is at a predetermined level;
   if the image value for the particular pixel is not at a predetermined level, using that image value when producing the pixel;
   if the image value for the particular pixel is at a predetermined level, obtaining a toner modification value; and
   determining a modified toner output value using the image value and the toner modification value.

2. The method of claim 1, further comprising the step of producing the particular pixel using the modified toner output value.

3. The method of claim 1, wherein the step of determining whether an image value for a particular pixel in the image is at a predetermined level comprises the step of determining whether an image value for a particular pixel in the image represents a full saturation level.

4. The method of claim 3, wherein the full saturation level represents black.

5. A method for variable toner output in an output device when the output device is producing an image, wherein the image is comprised of at least one pixel having an image value associated therewith, and wherein the output device has more than one toner modification value to select from, the method comprising the steps of:
   obtaining a toner modification value for a particular pixel in the image; and
   using the toner modification value and the image value for the particular pixel to determine a modified toner output value.

6. The method of claim 5, further comprising the step of using the modified toner output value to produce the particular pixel.

7. The method of claim 5, further comprising the steps of:
   before performing the step of obtaining a toner modification value for a particular pixel, first determine whether a toner modification value has been selected for a particular pixel in the image; and
   if a toner modification value for the particular pixel has not been selected, using the image value associated with the particular pixel to produce the particular pixel.

8. The method of claim 7, further comprising the steps of:
   before performing the step of determining whether a toner modification value has been selected for a particular pixel, first determine whether the image value for the particular pixel is at a predetermined level; and
   if the image value for the particular pixel is not at a predetermined level, using the image value associated with the particular pixel to produce the particular pixel.

9. The method of claim 8, wherein the step of determining whether an image value for a particular pixel is at a predetermined level comprises the step of determining whether an image value for a particular pixel represents a full saturation level.

10. The method of claim 9, wherein the full saturation level represents black.

11. A method for variable toner output in an output device when the output device is producing an image, wherein the image is comprised of at least one pixel having an image value associated therewith, and wherein the output device has more than one toner modification value to select from, the method comprising the steps of:
    if a toner modification value has been selected, analyzing a pixel matrix to determine whether the image values for the pixels in the pixel matrix are at a predetermined level;
    if the image values for the pixels in the pixel matrix are not at the predetermined level, using the image values associated with the pixels in the pixel matrix to produce the pixels in the pixel matrix;
    if the image values for the pixels in the pixel matrix are at the predetermined level, obtaining the selected toner modification value;
    using the selected toner modification value and at least one image value from at least one pixel in the pixel matrix to determine at least one modified toner output value; and
    using the at least one modified toner output value to produce at least one pixel in the pixel matrix that corresponds to the at least one modified toner output value.

12. The method of claim 11, further comprising the step of using the image values associated with the pixels in the pixel matrix to produce the pixels in the pixel matrix if a toner modification value has not been selected.

13. The method of claim 11, wherein the pixel matrix is comprised of a 3×3 matrix of pixels in the image.

14. The method of claim 13, wherein each row in the pixel matrix corresponds to a raster scan line in the image.

15. The method of claim 11, wherein the step of determining a toner modification value comprises the step of determining a toner modification value for each pixel matrix.

16. The method of claim 11, wherein the step of determining a toner modification value comprises the step of determining a toner modification value for the entire image.

17. The method of claim 11, wherein the step of using the toner modification value and at least one image value from at least one pixel in the pixel matrix to determine at least one modified toner output value comprises the step of comparing the toner modification value and at least one image value to determine at least one modification toner output value.

18. The method of claim 17, wherein the step of determining at least one modified toner output value comprises the step of determining at least one function that affects the amount of toner output by the output device.

19. The method of claim 18, wherein the step of determining at least one function that affects the amount of toner output by the output device comprises the step of determining at least one pulse width modulation value.

20. The method of claim 18, wherein the step of determining at least one function that affects the amount of toner output by the output device comprises the step of determining at least one pulse intensity modulation value.

21. A system for variable toner output in output devices, comprising:
    an input buffer, wherein the input buffer stores at least a portion of image values from at least a portion of pixels in an image;

a comparator connected to the output of the input buffer, wherein the comparator compares the image values with a toner modification value to produce a modified toner output value for at least one image value; and a memory, wherein the at least one modified toner output value is stored before being output by the output device.

22. The system of claim 21, further comprising an output buffer connected between the comparator and the memory, wherein the input of the output buffer is connected to the output of the comparator and the output of the output buffer is connected to input of the memory, and wherein the output buffer temporarily stores the at least one modified toner output value.

23. The system of claim 21, wherein the memory is comprised of a random access memory (RAM).

* * * * *